US010113932B2

(12) United States Patent
Inoue

(10) Patent No.: US 10,113,932 B2
(45) Date of Patent: Oct. 30, 2018

(54) METHOD AND APPARATUS FOR DETECTING BREAKAGE OF PIPING IN COMBINED POWER PLANTS

(71) Applicant: MITSUBISHI HITACHI POWER SYSTEMS, LTD., Kanagawa (JP)

(72) Inventor: Masakazu Inoue, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/119,233

(22) PCT Filed: Mar. 6, 2015

(86) PCT No.: PCT/JP2015/056676
§ 371 (c)(1),
(2) Date: Aug. 16, 2016

(87) PCT Pub. No.: WO2015/146547
PCT Pub. Date: Oct. 1, 2015

(65) Prior Publication Data
US 2017/0010176 A1 Jan. 12, 2017

(30) Foreign Application Priority Data
Mar. 25, 2014 (JP) .................................. 2014-062783

(51) Int. Cl.
*G01M 3/28* (2006.01)
*F01K 17/02* (2006.01)
(Continued)

(52) U.S. Cl.
CPC ........... *G01M 3/2815* (2013.01); *F01K 13/02* (2013.01); *F01K 17/025* (2013.01); *F01K 23/10* (2013.01);
(Continued)

(58) Field of Classification Search
CPC ........................... G01M 3/2815; F01K 17/025
See application file for complete search history.

(56) References Cited

U.S. PATENT DOCUMENTS 3,919,880 A * 11/1975 Seyd ................. G01M 3/022
138/90
2012/0150455 A1* 6/2012 Franklin ............. G01M 3/2815
702/51

FOREIGN PATENT DOCUMENTS

JP 57023798 A * 2/1982
JP 2-13812 1/1990
(Continued)

OTHER PUBLICATIONS

International Search Report dated May 26, 2015 in International (PCT) Application No. PCT/JP2015/056676.
(Continued)

*Primary Examiner* — Paul West
(74) *Attorney, Agent, or Firm* — Wenderoth, Lind & Ponack, L.L.P.

(57) ABSTRACT

A method and an apparatus for detecting breakage of piping, the method including the steps of: closing an outlet of heat exchanger tubes with an outlet-side shutoff valve; supplying high-temperature water into the heat exchanger tubes with a desalinated water pump; closing an inlet of the heat exchanger tubes with an inlet-side main shutoff valve and an inlet-side auxiliary shutoff valve with the heat exchanger tubes filled with the high-temperature water; and determining breakage of the heat exchanger tubes based on a change in the pressure of the high-temperature water in the heat exchanger tubes with the inlet and the outlet closed.

7 Claims, 4 Drawing Sheets

(51) Int. Cl.
- *F02C 6/18* (2006.01)
- *F02C 7/224* (2006.01)
- *F01K 13/02* (2006.01)
- *F01K 23/10* (2006.01)

(52) U.S. Cl.
CPC ............... *F02C 6/18* (2013.01); *F02C 7/224* (2013.01); *G01M 3/2846* (2013.01); *F05D 2260/83* (2013.01); *Y02E 20/16* (2013.01)

(56) References Cited

FOREIGN PATENT DOCUMENTS

| | | |
|---|---|---|
| JP | 2-35326 | 2/1990 |
| JP | 2002-174458 | 6/2002 |
| JP | 2002-286580 | 10/2002 |
| JP | 2003185378 A * | 7/2003 |
| JP | 2010-91221 | 4/2010 |

OTHER PUBLICATIONS

Written Opinion of the International Searching Authority dated May 26, 2015 in International (PCT) Application No. PCT/JP2015/056676, with English translation.

* cited by examiner

METHOD AND APPARATUS FOR DETECTING BREAKAGE OF PIPING IN COMBINED POWER PLANTS

FIELD

The present invention relates to a method and an apparatus for detecting breakage of piping applied, for example, to combined cycle power plants and the like.

BACKGROUND

Combined cycle power plants are combined power-generating plants in which a gas turbine and a steam turbine are combined. The combined cycle power plants generate power by driving the gas turbine with combustion gas generated by supplying fuel gas to compressed air for combustion, and generate power by driving the steam turbine with steam generated by feeding high-temperature flue gas discharged from the gas turbine to a heat recovery steam generator and generating steam using a heating unit of the heat recovery steam generator.

Such combined cycle power plants are provided with a fuel gas heating apparatus for heating fuel gas with high-temperature water from a heat recovery steam generator. The fuel gas heating apparatus includes a large number of tubes disposed in the heating apparatus body. Fuel gas is supplied to the heating apparatus body while high-temperature water is supplied to the large number of tubes, so that heat exchange is performed between the fuel gas and the high-temperature water.

In the fuel gas heating apparatus, long-term use can cause a leak (leakage) of fuel gas or high-temperature water due to breakage of a tube. Thus detection of tube leaks is performed during operation or during halts. During the operation of the fuel gas heating apparatus, a tube leak is detected conventionally by detecting the amount of water leaking from a tube to the heating apparatus body because the feedwater pressure is higher than the pressure of the fuel gas. During a halt of the fuel gas heating apparatus, a tube leak is detected according to a decreasing tendency of the feedwater pressure because the pressure of the fuel gas cooled is higher than the feedwater pressure.

A method for detecting tube leaks in a fuel gas heating apparatus is described, for example, in Patent Literature 1. An apparatus and a method for detecting breakage of a tube in a gas heating apparatus described in Patent Literature 1 determine that the tube is broken when a condition in which a pressure differential between the pressure in the tube on the container outlet side and the pressure of gas passing through the container is substantially zero continues for a specified time or more after stopping the supply of a fluid to the tube and discharging the fluid to the outside of the tube.

CITATION LIST

Patent Literature

Patent Literature 1: Japanese Laid-open Patent Publication No. 2010-091221 A

SUMMARY

Technical Problem

When a tube leak in the fuel gas heating apparatus is detected, it is necessary to stop the operation of the combined cycle power plant, and then exchange the tube of the fuel gas heating apparatus, which has a problem of reducing the operating rate. Thus, there is a demand to detect tube leaks in the fuel gas heating apparatus during periodical checks of the combined cycle power plant. However, since water is discharged from the tubes in the fuel gas heating apparatus during a periodical check of the combined cycle power plant, a technique of detecting breakage of a tube with water being in the tube like the above-described conventional art cannot be applied.

The present invention solves the above-described problem, and has an object of providing a method and an apparatus for detecting breakage of piping, capable of properly detecting breakage of piping regardless of the presence or absence of a fluid in a container.

Solution to Problem

According to embodiments, there is provided a method for detecting breakage of piping in a combined power plant in which piping through which a second fluid circulates is disposed in a container through which a first fluid circulates for heat exchange between the first fluid and the second fluid, the method comprising the steps of: closing an outlet of the piping; supplying the second fluid into the piping with a pump; closing an inlet of the piping with the piping filled with the second fluid; and determining breakage of the piping based on a change in pressure of the second fluid in the piping with the inlet and the outlet closed.

Thus, breakage of the piping is determined based on a change in the pressure of the second fluid in the piping with the piping filled with the second fluid and with the inlet and the outlet of the piping closed. Therefore, when there is a breakage in the piping, the second fluid leaks from the breakage, reducing the pressure, and the breakage of the piping can be properly detected regardless of the presence or absence of the fluid in the container.

According to embodiments, it is determined that the piping is broken when the pressure of the second fluid in the piping with the inlet and the outlet closed deviates from a preset predetermined pressure range.

Thus, since the pressure of the second fluid trapped in the piping varies with temperature or the like, by setting a determination criteria value to the predetermined pressure range, breakage of the piping can be properly detected.

According to embodiments, the predetermined pressure range is set based on a pressure of the second fluid in the piping with the inlet and the outlet closed detected last time.

Thus, by setting a determination criteria value to the pressure of the second fluid detected last time, breakage of the piping can be properly detected.

According to embodiments, breakage of the piping is determined based on a change in the pressure of the second fluid in the piping after the second fluid is supplied to the piping in the combined power plant.

Thus, since breakage of the piping is determined based on a change in the pressure of the second fluid after the supply of the second fluid to the piping, breakage of the piping can be determined before preparation for the operation of the heat exchanger, and useless supply of the first fluid to the container can be stopped.

According to embodiments, breakage of the piping is determined based on a change in the pressure of the second fluid in the piping after an increase in pressure of the piping in the combined power plant.

Thus, since breakage of the piping is determined based on a change in the pressure of the second fluid after an increase in the pressure of the piping, small-scale breakage of the piping can be detected.

According to embodiments, breakage of the piping is determined based on a change in the pressure of the second fluid in the piping after the inlet and the outlet are closed and the pump is stopped.

Thus, in addition to breakage of the piping, leakage at a position where the inlet is closed can be detected.

According to embodiments, the combined power plant includes a plurality of heat exchange units connected in series, the inlet and the outlet of the piping and a space between the plurality of heat exchange units are closed with the piping filled with the second fluid, and breakage of the piping is determined based on a change in the pressure of the second fluid in each region in the piping closed.

Thus, since breakage of the piping is determined based on a change in the pressure of the second fluid in each region in the piping with the inlet and the outlet of the piping and a space between the plurality of heat exchange units closed, breakages of the respective piping in the plurality of heat exchange units can be simultaneously detected.

According to embodiments, there is provided an apparatus for detecting breakage of piping, comprising: a container through which a first fluid circulates; piping through which a second fluid circulates, disposed in the container; a pump that supplies the second fluid into the piping; an inlet-side shutoff valve and an outlet-side shutoff valve that close an inlet and an outlet of the piping; a pressure sensor that detects a pressure of the second fluid in the piping with the inlet and the outlet closed by the inlet-side shutoff valve and the outlet-side shutoff valve; and a determination device that determines that the piping is broken when a detected pressure detected by the pressure sensor deviates from a preset predetermined pressure range.

Thus, when the second fluid is supplied into the piping with the pump after closing the outlet of the piping by the outlet-side shutoff valve, and the piping is filled with the second fluid, the inlet of the piping is closed by the inlet-side shutoff valve. Then, the pressure of the second fluid in the piping with the inlet and the outlet closed is detected by the pressure sensor. The determination device determines that the piping is broken when the detected pressure deviates from the predetermined pressure range. Therefore, when there is a breakage in the piping, the second fluid leaks from the breakage, reducing the pressure, and the breakage of the piping can be properly detected regardless of the presence or absence of the fluid in the container.

Advantageous Effects of Invention

According to the method and the apparatus for detecting breakage of piping of the present invention, breakage of piping is determined based on a change in the pressure of the second fluid in the piping with the piping filled with the second fluid and with the inlet and the outlet of the piping closed, so that the breakage of the piping can be properly detected regardless of the presence or absence of the fluid in the container.

DESCRIPTION OF EMBODIMENTS

Hereinafter with reference to the accompanying drawings, preferred embodiments of a method and an apparatus for detecting breakage of piping of the present invention will be described in detail. The present invention is not limited to these embodiments, and includes those configured by combining the embodiments.

First Embodiment

Figure 1:
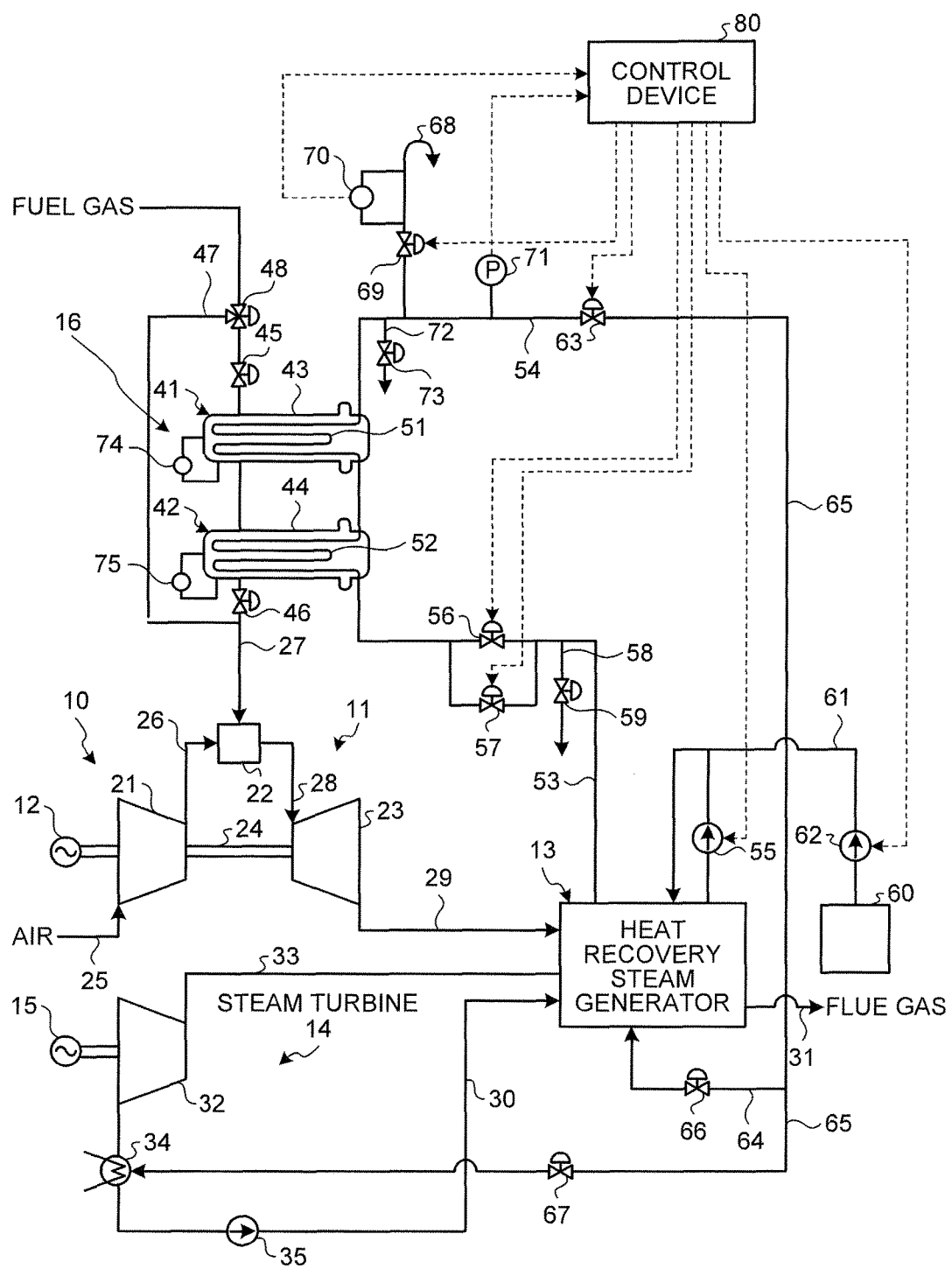
FIG. 1 is a schematic configuration diagram illustrating an apparatus for detecting breakage of piping in a first embodiment.
Figure 2:
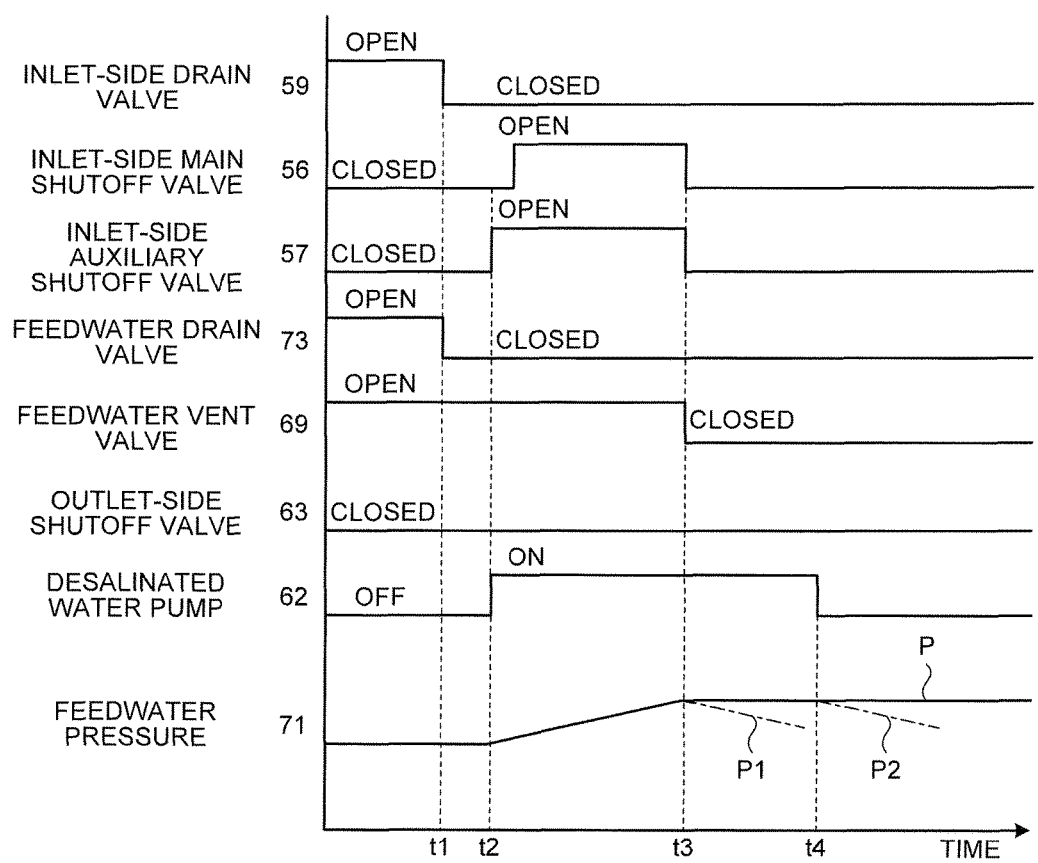
FIG. 2 is a time chart for explaining a method for detecting breakage of piping during water filling.
Figure 3:
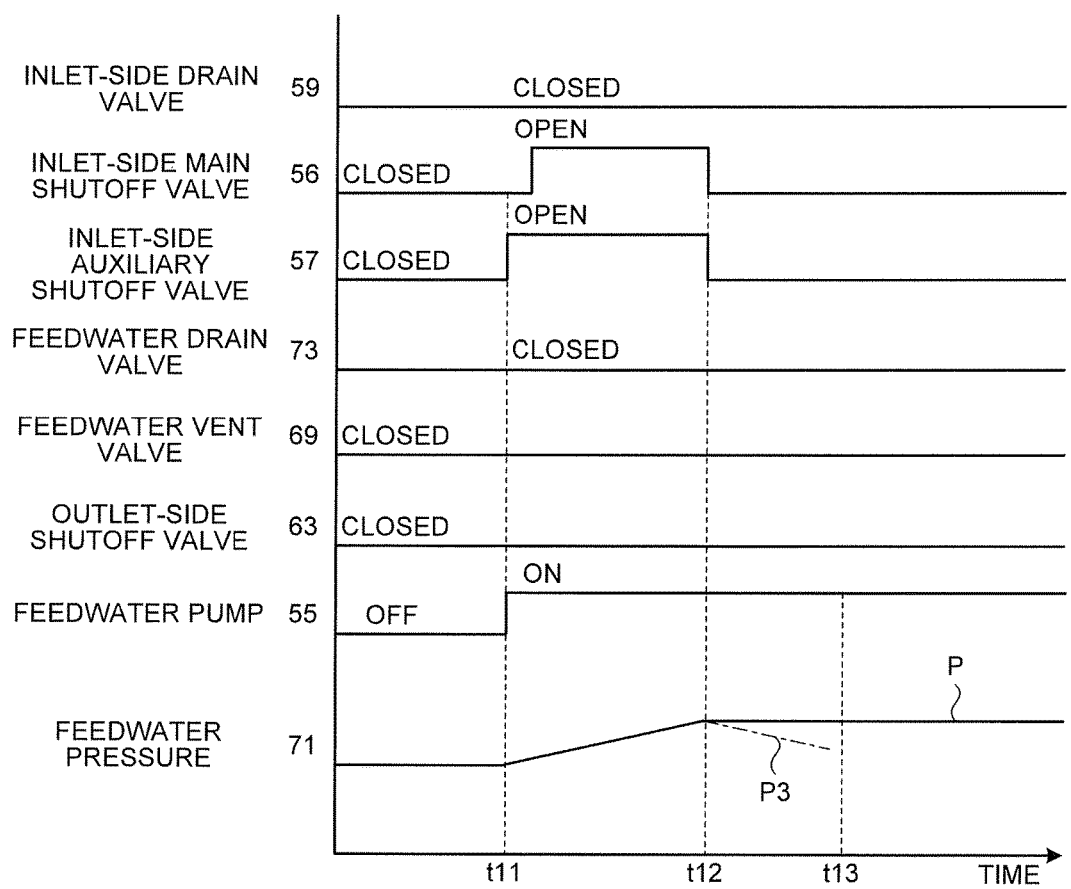
FIG. 3 is a time chart for explaining a method for detecting breakage of piping during startup of a steam generator.

FIG. 1 is a schematic configuration diagram illustrating an apparatus for detecting breakage of piping in the first embodiment. FIG. 2 is a time chart for explaining a method for detecting breakage of piping during water filling. FIG. 3 is a time chart for explaining a method for detecting breakage of piping during startup of a steam generator.

The method and apparatus for detecting breakage of piping in the first embodiment are applied to a fuel gas heating apparatus (heat exchanger) in a combined cycle power plant in which a gas turbine and a steam turbine are combined. The fuel gas heating apparatus, in which piping through which high-temperature water (second fluid) circulates is disposed in a container through which fuel gas (first fluid) circulates, heats the fuel gas with the high-temperature water by heat exchange between the fuel gas and the high-temperature water.

In the first embodiment, as illustrated in FIG. 1, a combined cycle power plant 10 has a gas turbine 11, a generator 12, a heat recovery steam generator (HRSG) 13, a steam turbine 14, a generator 15, and a fuel gas heating apparatus 16.

The gas turbine 11 has a compressor 21, a combustor 22, and a turbine 23. The compressor 21 and the turbine 23 are coupled by a rotation shaft 24 integrally and rotatably. The compressor 21 compresses air taken in from an air intake line 25. The combustor 22 mixes compressed air supplied from the compressor 21 through a compressed air supply line 26 and fuel gas supplied from a fuel gas supply line 27 for combustion. The turbine 23 rotates by combustion gas supplied from the combustor 22 through a flue gas supply line 28. The generator 12 is provided coaxially with the turbine 23, and can generate power by the turbine 23 rotating. Here, as the fuel gas supplied to the combustor 22, liquefied natural gas (LNG) is used, for example.

A flue gas line 29 from the gas turbine 11 (the turbine 23) is connected to the heat recovery steam generator 13, which generates steam by performing heat exchange between high-temperature flue gas supplied from the flue gas line 29 and water supplied from a feedwater line 30. The heat recovery steam generator 13 removes toxic substances from flue gas from which heat has been recovered through heat exchange with water supplied from the feedwater line 30, and releases it into the atmosphere through a discharge line 31.

The steam turbine 14 has a turbine 32. The turbine 32 can rotate by being supplied with steam generated in the heat recovery steam generator 13 through a steam supply line 33. Steam that has worked, rotationally driving the turbine 32 is returned to the heat recovery steam generator 13 through the feedwater line 30. The feedwater line 30 is provided with a condenser 34 and a feedwater pump 35. Steam is cooled by the condenser 34 into condensate to be fed to the heat recovery steam generator 13 by the feedwater pump 35. The generator 15 is provided coaxially with the turbine 32, and can generate power by the turbine 32 rotating.

The fuel gas heating apparatus 16 has a plurality of (two in the present embodiment) heaters 41, 42. The fuel gas heating apparatus 16 (the heaters 41, 42) heats fuel gas to be supplied to the combustor 22 through the fuel gas supply line 27 with high-temperature water of the heat recovery steam generator 13. The first heater 41 and the second heater 42 have substantially the same configuration, and have containers 43, 44. The fuel gas supply line 27 communicates with the containers 43, 44 in series, and is provided with a fuel gas inlet valve 45 upstream, and is provided with a fuel gas outlet valve 46 downstream. The fuel gas supply line 27 is also provided with a bypass line 47 bypassing the containers 43, 44. A fuel gas temperature control valve 48 is provided at a bifurcation of the fuel gas supply line 27 and the bypass line 47.

The first heater 41 and the second heater 42 have heat exchanger tubes (piping) 51, 52 disposed in a bended state in the containers 43, 44. The heat exchanger tubes 51, 52 are connected in series. A high-temperature water supply line 53 from the heat recovery steam generator 13 is connected to the heat exchanger tube 52, and a high-temperature water return line 54 is connected to the heat exchanger tube 51.

The high-temperature water supply line 53 is provided, from the heat recovery steam generator 13 side, with a feedwater pump 55, and an inlet-side main shutoff valve 56 and an inlet-side auxiliary shutoff valve 57. The inlet-side main shutoff valve 56 and the inlet-side auxiliary shutoff valve 57 are provided in parallel in the high-temperature water supply line 53. The high-temperature water supply line 53 is also provided with an inlet-side drain passage 58 and an inlet-side drain valve 59 between the feedwater pump 55 and the shutoff valves 56, 57. A feedwater tank 60 can store a predetermined amount of water, and is connected between the feedwater pump 55 and the inlet-side drain passage 58 through a water filling line 61. The water filling line 61 is provided with a desalinated water pump 62. Thus, water in the feedwater tank 60 joins the high-temperature water supply line 53 through the water filling line 61, and is heated by the heat recovery steam generator 13 and then fed to the heater 42.

The high-temperature water return line 54 is provided with an outlet-side shutoff valve 63, and branches downstream into a first return line 64 leading to the heat recovery steam generator 13 and a second return line 65 leading to the condenser 34. The first return line 64 and the second return line 65 are provided with temperature control valves 66, 67, respectively. The high-temperature water return line 54 is also provided with a feedwater vent line 68 between the first heater 41 and the outlet-side shutoff valve 63. A feedwater vent valve 69 and a feedwater level sensor 70 are provided in the feedwater vent line 68. The high-temperature water return line 54 is provided with a pressure sensor 71 for detecting feedwater pressure between the feedwater vent line 68 and the outlet-side shutoff valve 63. The high-temperature water return line 54 is further provided with a feedwater drain passage 72 and a feedwater drain valve 73 between the first heater 41 and the feedwater vent line 68.

The first heater 41 and the second heater 42 are provided with level sensors 74, 75 for detecting the amount of leakage of feedwater leaking from the heat exchanger tubes 51, 52 into the containers 43, 44.

Therefore, in the fuel gas heating apparatus 16, by opening the fuel gas inlet valve 45 and the fuel gas outlet valve 46, and setting the fuel gas temperature control valve 48 at a predetermined degree of opening, fuel gas is fed through the fuel gas supply line 27 and the bypass line 47 to the containers 43, 44 of the first heater 41 and the second heater 42. On the other hand, by opening the inlet-side main shutoff valve 56 and the outlet-side shutoff valve 63, setting the temperature control valves 66, 67 at a predetermined degree of opening, and driving the feedwater pump 55, high-temperature water from the heat recovery steam generator 13 is fed through the high-temperature water supply line 53 to the heat exchanger tubes 51, 52 of the first heater 41 and the second heater 42. Then, heat exchange is performed between the fuel gas fed to the containers 43, 44 and the high-temperature water flowing through the heat exchanger tubes 51, 52, and the fuel gas is heated by the high-temperature water.

In the fuel gas heating apparatus 16 configured like this, long-term use can cause breakage in the heat exchanger tubes 51, 52, causing leakage of the fuel gas or the high-temperature water. Thus, in the present embodiment, a broken condition of the heat exchanger tubes 51, 52 is detected during a periodical check of the combined cycle power plant 10.

The method for detecting breakage of piping in the present embodiment includes the steps of: closing the outlet-side shutoff valve 63; supplying high-temperature water into the heat exchanger tubes 51, 52 with the desalinated water pump 62 (or the feedwater pump 55); closing the inlet-side main shutoff valve 56 and the inlet-side auxiliary shutoff valve 57 with the heat exchanger tubes 51, 52 filled with the high-temperature water; and determining breakage of the heat exchanger tubes 51, 52 based on a change in the pressure of the high-temperature water in the heat exchanger tubes 51, 52 closed by the inlet-side main shutoff valve 56 and the inlet-side auxiliary shutoff valve 57, and the outlet-side shutoff valve 63.

For this, the apparatus for detecting breakage of piping in the present embodiment has a control device 80 as a determination device of the present invention. The control device 80 determines that the heat exchanger tubes 51, 52 are broken when a detected pressure detected by the pressure sensor 71 deviates from a preset predetermined pressure range with the high-temperature water supply line 53, the heat exchanger tubes 51, 52, and the high-temperature water return line 54 filled with high-temperature water, and with the inlet-side main shutoff valve 56 and the inlet-side auxiliary shutoff valve 57, and the outlet-side shutoff valve 63 closed.

Here, the control device 80 can drive and stop the feedwater pump 55 and the desalinated water pump 62. The control device 80 can control the opening and closing of the inlet-side main shutoff valve 56, the inlet-side auxiliary shutoff valve 57, the outlet-side shutoff valve 63, and the feedwater vent valve 69. The control device 80 is fed the feedwater level in the feedwater vent line 68 detected by the feedwater level sensor 70 and the detected pressure of high-temperature water detected by the pressure sensor 71.

In addition to the above-described valves 56, 57, 63, and 69, the control device 80 can control the opening and closing of the other valves 45, 48, 59, 66, 67, and 73. The control device 80 is also fed the amounts of leakage of high-temperature water from the heat exchanger tubes 51, 52 in the first heater 41 and the second heater 42 detected by the level sensors 74, 75.

Hereinafter, the method for detecting breakage of piping in the first embodiment will be described in detail with reference to the time chart in FIG. 2. A periodical check of the combined cycle power plant 10 is performed in a condition in which all water in the lines has been discharged. Therefore, to start the combined cycle power plant 10 after a periodical check, first, an operation of filling the lines with water is performed.

In the method for detecting breakage of piping in the first embodiment, as illustrated in FIGS. 1 and 2, at time t1, the inlet-side drain valve 59 and the feedwater drain valve 73 are closed. At time t2, the inlet-side main shutoff valve 56 and the inlet-side auxiliary shutoff valve 57 are opened, the outlet-side shutoff valve 63 is maintained in a closed state, and the desalinated water pump 62 is driven. The inlet-side main shutoff valve 56 is opened after a lapse of a predetermined time since the opening of the inlet-side auxiliary shutoff valve 57 at time t2. Then, supply of water to the high-temperature water supply line 53, the heat exchanger tubes 51, 52, and the high-temperature water return line 54 is started, and internal air is discharged through the feedwater vent line 68 (the feedwater vent valve 69), so that the feedwater pressure (the pressure sensor 71) increases.

Then, at time t3 at which the feedwater level in the feedwater vent line 68 detected by the feedwater level sensor 70 reaches a preset predetermined feedwater level, the feedwater vent valve 69 is closed, and the inlet-side main shutoff valve 56 and the inlet-side auxiliary shutoff valve 57 are closed. Here, the high-temperature water supply line 53, the heat exchanger tubes 51, 52, and the high-temperature water return line 54 isolated by the inlet-side main shutoff valve 56 and the inlet-side auxiliary shutoff valve 57, and the outlet-side shutoff valve 63 are maintained at a predetermined pressure.

The control device 80 determines breakage of the heat exchanger tubes 51, 52 based on a change in the pressure of the high-temperature water in the high-temperature water supply line 53, the heat exchanger tubes 51, 52, and the high-temperature water return line 54 closed by the inlet-side main shutoff valve 56 and the inlet-side auxiliary shutoff valve 57, and the outlet-side shutoff valve 63. Specifically, when the pressure of the high-temperature water (feedwater pressure) P is kept constant at time t4 at which a predetermined time has elapsed since time t3, the control device 80 determines that there is no leakage from the heat exchanger tubes 51, 52, nor breakage therein. On the other hand, when the pressure of the high-temperature water (feedwater pressure) P has decreased like pressure P1 at time t4, the control device 80 determines that there is leakage of the high-temperature water from the heat exchanger tubes 51, 52, and that there is the possibility of breakage of the heat exchanger tubes 51, 52.

In practice, the control device 80 determines that the heat exchanger tubes 51, 52 are broken when the pressure of the high-temperature water in the high-temperature water supply line 53, the heat exchanger tubes 51, 52, and the high-temperature water return line 54 closed by the inlet-side main shutoff valve 56 and the inlet-side auxiliary shutoff valve 57, and the outlet-side shutoff valve 63 deviates from a preset predetermined pressure range. Since the pressure of high-temperature water varies slightly with temperature or the like at the time, it is desirable to set a pressure range to determine that there is no leakage, taking the temperature variations into consideration. When the predetermined pressure range is set, the setting can be based on the pressure of the high-temperature water detected last time (in the past). Specifically, when a deviation of the pressure of the high-temperature water detected this time from the pressure of the high-temperature water detected last time is a predetermined value or more, the control device 80 determines that there are leakage from the heat exchanger tubes 51, 52 and breakage therein.

At time t4, the desalinated water pump 62 is stopped. Here, when the pressure of the high-temperature water (feedwater pressure) P is kept constant, the control device 80 determines that there is no leakage from the heat exchanger tubes 51, 52, nor breakage therein. On the other hand, here, when the pressure of the high-temperature water (feedwater pressure) P has decreased like pressure P2, the control device 80 determines that there is leakage of the high-temperature water from the inlet-side main shutoff valve 56 and the inlet-side auxiliary shutoff valve 57, and the heat exchanger tubes 51, 52, and that the inlet-side main shutoff valve 56 or the inlet-side auxiliary shutoff valve 57 has failed, and that the heat exchanger tubes 51, 52 are broken.

Specifically, since the desalinated water pump 62 is driven at time t4, when the inlet-side main shutoff valve 56 or the inlet-side auxiliary shutoff valve 57 has failed and the heat exchanger tubes 51, 52 are broken, the amount of water leaking from the heat exchanger tubes 51, 52 may be supplied to the heat exchanger tubes 51, 52 through the inlet-side main shutoff valve 56 or the inlet-side auxiliary shutoff valve 57. Therefore, even if the pressure of the high-temperature water (feedwater pressure) P is kept constant here, it cannot be reliably determined that the heat exchanger tubes 51, 52 are not broken. Therefore, when the desalinated water pump 62 is stopped, and the pressure of the high-temperature water (feedwater pressure) P has decreased like pressure P2, it can be determined that the inlet-side main shutoff valve 56 or the inlet-side auxiliary shutoff valve 57 has failed, and that the heat exchanger tubes 51, 52 are broken.

Thereafter, when it is determined that neither the inlet-side main shutoff valve 56 nor the inlet-side auxiliary shutoff valve 57 has failed, and that the heat exchanger tubes 51, 52 are not broken, the inlet-side main shutoff valve 56 and the inlet-side auxiliary shutoff valve 57 are opened, and the desalinated water pump 62 is driven, to continue the operation of filling the lines with water. When the operation of filling all the lines with water is completed, the inlet-side main shutoff valve 56 and the inlet-side auxiliary shutoff valve 57 are closed, and the desalinated water pump 62 is stopped.

When the operation of filling all the lines with water is completed, the combined cycle power plant 10 is started. Specifically, as illustrated in FIG. 3, at time t11, the inlet-side main shutoff valve 56 and the inlet-side auxiliary shutoff valve 57 are opened, the outlet-side shutoff valve 63 is maintained in the closed state, and the feedwater pump 55 is driven. The inlet-side main shutoff valve 56 is opened after a lapse of a predetermined time since the opening of the inlet-side auxiliary shutoff valve 57 at time t12. Then, supply of water to the high-temperature water supply line 53, the heat exchanger tubes 51, 52, and the high-temperature water return line 54 is started, and the pressure of the high-temperature water filling the inside (the pressure sensor 71) increases.

Then, at time t12 at which the pressure of the high-temperature water (the pressure sensor 71) reaches a predetermined pressure, the inlet-side main shutoff valve 56 and the inlet-side auxiliary shutoff valve 57 are closed. Here, the high-temperature water supply line 53, the heat exchanger tubes 51, 52, and the high-temperature water return line 54 isolated by the inlet-side main shutoff valve 56 and the inlet-side auxiliary shutoff valve 57, and the outlet-side shutoff valve 63 are maintained under a predetermined high pressure.

The control device 80 determines breakage of the heat exchanger tubes 51, 52 based on a change in the pressure of the high-temperature water in the high-temperature water supply line 53, the heat exchanger tubes 51, 52, and the high-temperature water return line 54 closed by the inlet-side main shutoff valve 56 and the inlet-side auxiliary shutoff valve 57, and the outlet-side shutoff valve 63. Specifically, when the pressure of the high-temperature water (feedwater pressure) P is kept constant at time t13 at which a predetermined time has elapsed since time t12, the control device 80 determines that there is no leakage from the heat exchanger tubes 51, 52, nor breakage therein. On the other hand, when the pressure of the high-temperature water (feedwater pressure) P has decreased like pressure P3 at time t13, the control device 80 determines that there is leakage of the high-temperature water from the heat exchanger tubes 51, 52, and that the heat exchanger tubes 51, 52 are broken.

The method for detecting breakage of piping in the first embodiment thus includes the steps of: closing the outlet of the heat exchanger tubes 51, 52 with the outlet-side shutoff valve 63; supplying high-temperature water into the heat exchanger tubes 51, 52 with the desalinated water pump 62; closing the inlet of the heat exchanger tubes 51, 52 with the inlet-side main shutoff valve 56 and the inlet-side auxiliary shutoff valve 57 with the heat exchanger tubes 51, 52 filled with the high-temperature water; and determining breakage of the heat exchanger tubes 51, 52 based on a change in the pressure of the high-temperature water in the heat exchanger tubes 51, 52 with the inlet and the outlet closed.

Accordingly, breakage of the heat exchanger tubes 51, 52 is determined based on a change in the pressure of the high-temperature water in the heat exchanger tubes 51, 52 with the heat exchanger tubes 51, 52 filled with the high-temperature water, and with the inlet and the outlet of the heat exchanger tubes 51, 52 closed. Therefore, when there is a breakage in the heat exchanger tubes 51, 52, the high-temperature water leaks from the breakage, reducing the pressure, so that the breakage of the heat exchanger tubes 51, 52 can be properly detected regardless of the presence or absence of the fuel gas in the containers 43, 44.

In the method for detecting breakage of piping in the first embodiment, it is determined that the heat exchanger tubes 51, 52 are broken when the pressure of the high-temperature water in the heat exchanger tubes 51, 52 with the inlet and the outlet closed deviates from the preset predetermined pressure range. Accordingly, since the pressure of the high-temperature water trapped in the heat exchanger tubes 51, 52 varies with temperature or the like, by setting a determination criteria value to the predetermined pressure range, breakage of the heat exchanger tubes 51, 52 can be properly detected.

In the method for detecting breakage of piping in the first embodiment, the predetermined pressure range is set based on the pressure of the high-temperature water in the heat exchanger tubes 51, 52 with the inlet and the outlet closed detected last time. Accordingly, by setting a determination criteria value to the pressure of the high-temperature water detected last time, breakage of the heat exchanger tubes 51, 52 can be properly detected.

In the method for detecting breakage of piping in the first embodiment, breakage of the heat exchanger tubes 51, 52 is determined based on a change in the pressure of the high-temperature water in the heat exchanger tubes 51, 52 after the supply of the fluid of the high-temperature water to the heat exchanger tubes 51, 52. Accordingly, breakage of the heat exchanger tubes 51, 52 can be determined before preparation for the operation of the fuel gas heating apparatus 16, and useless supply of fuel gas to the containers 43, 44 can be stopped.

In the method for detecting breakage of piping in the first embodiment, breakage of the heat exchanger tubes 51, 52 is determined based on a change in the pressure of the high-temperature water in the heat exchanger tubes 51, 52 after an increase in the pressure in the heat exchanger tubes 51, 52. Accordingly, since it is determined that the heat exchanger tubes 51, 52 are broken based on leakage of the high-temperature water from the heat exchanger tubes 51, 52 under high pressure, a small-scale breakage of the heat exchanger tubes 51, 52 can be detected.

In the method for detecting breakage of piping in the first embodiment, breakage of the heat exchanger tubes 51, 52 is determined based on a change in the pressure of the high-temperature water in the heat exchanger tubes 51, 52 after the inlet and the outlet are closed and then the desalinated water pump 62 is stopped. Accordingly, in addition to breakage of the heat exchanger tubes 51, 52, leakage at the inlet-side main shutoff valve 56 and the inlet-side auxiliary shutoff valve 57 can be detected.

The apparatus for detecting breakage of piping in the first embodiment is provided with the containers 43, 44 through which fuel gas circulates, the heat exchanger tubes 51, 52 through which high-temperature water circulates, disposed in the containers 43, 44, the desalinated water pump 62 for supplying high-temperature water into the heat exchanger tubes 51, 52, the inlet-side shutoff valves 56, 57 and the outlet-side shutoff valve 63 for closing the inlet and the outlet of the heat exchanger tubes 51, 52, the pressure sensor 71 for detecting pressure of the high-temperature water in the heat exchanger tubes 51, 52 with the inlet and the outlet closed by the inlet-side shutoff valves 56, 57 and the outlet-side shutoff valve 63, and the control device 80 for determining that the heat exchanger tubes 51, 52 are broken when the pressure of the high-temperature water detected by the pressure sensor 71 deviates from the preset predetermined pressure range.

Accordingly, when there is a breakage in the heat exchanger tubes 51, 52, the high-temperature water leaks from the breakage, reducing the pressure, so that the breakage of the heat exchanger tubes 51, 52 can be properly detected regardless of the presence or absence of the fluid in the containers 43, 44.

Second Embodiment

Figure 4:
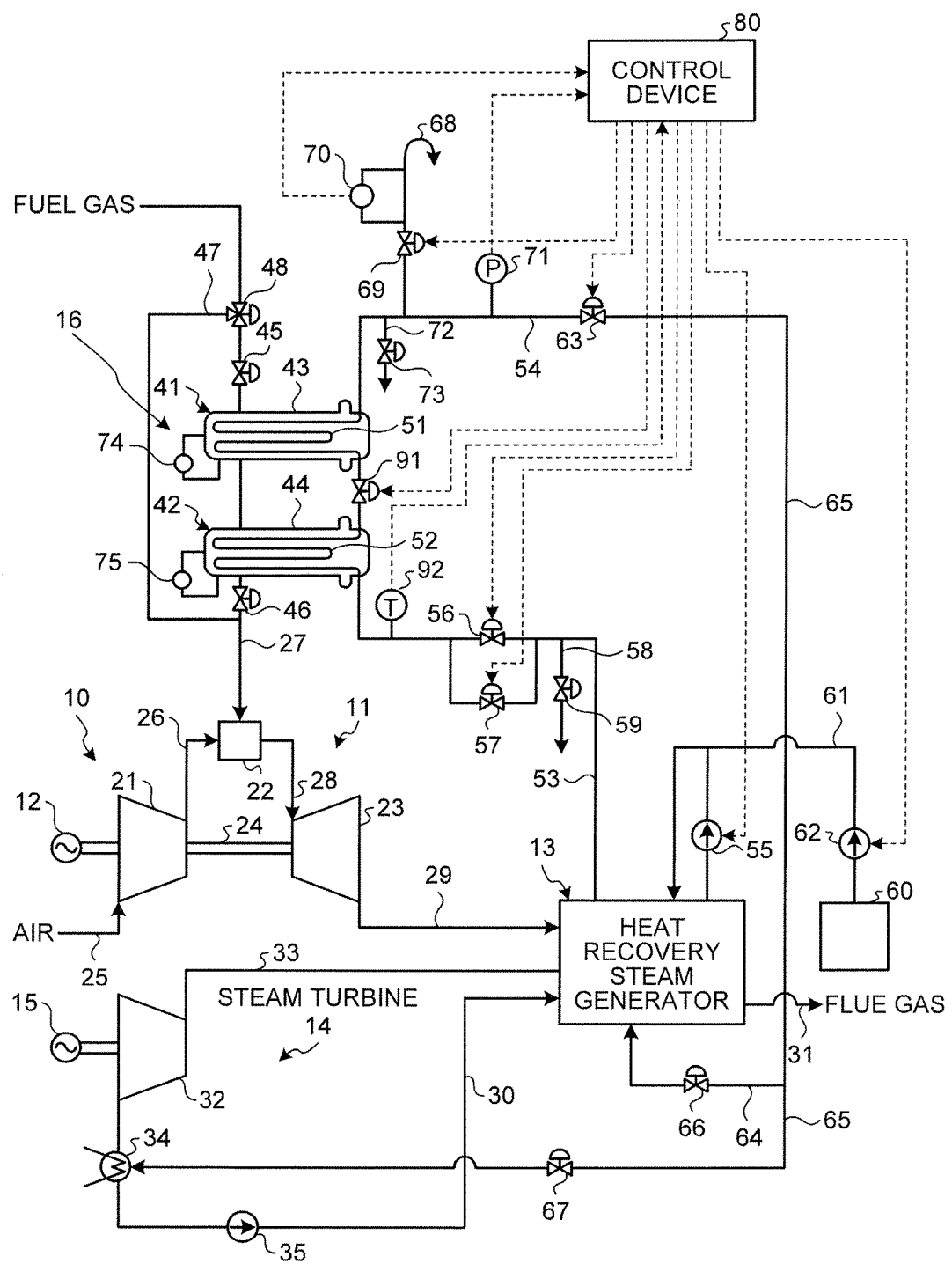
FIG. 4 is a schematic configuration diagram illustrating an apparatus for detecting breakage of piping in a second embodiment.

FIG. 4 is a schematic configuration diagram illustrating an apparatus for detecting breakage of piping in a second embodiment. Members having the same functions as those in the above-described embodiment are denoted by the same reference numerals and will not be described in detail.

As in the first embodiment, a method and an apparatus for detecting breakage of piping in the second embodiment are applied to a fuel gas heating apparatus (heat exchanger) in a combined cycle power plant in which a gas turbine and a steam turbine are combined. The fuel gas heating apparatus, in which piping through which high-temperature water (second fluid) circulates is disposed in a container through which fuel gas (first fluid) circulates, heats the fuel gas with the high-temperature water by heat exchange between the fuel gas and the high-temperature water.

In the second embodiment, as illustrated in FIG. 4, a combined cycle power plant 10 has a gas turbine 11, a generator 12, a heat recovery steam generator (HRSG) 13, a steam turbine 14, a generator 15, and a fuel gas heating apparatus 16.

The fuel gas heating apparatus 16 has a first heater 41 and a second heater 42, and heats fuel gas to be supplied to a combustor 22 through a fuel gas supply line 27 with high-temperature water of the heat recovery steam generator 13. The first heater 41 and the second heater 42 have containers 43, 44, communicate with the fuel gas supply line 27 in series, and are provided with a fuel gas inlet valve 45 upstream, and are provided with a fuel gas outlet valve 46 downstream.

The first heater 41 and the second heater 42 have heat exchanger tubes (piping) 51, 52 disposed in a bended state in the containers 43, 44 and connected in series. A high-temperature water supply line 53 from the heat recovery steam generator 13 is connected to the heat exchanger tube 52, and a high-temperature water return line 54 is connected to the heat exchanger tube 51. An opening/closing valve 91 is provided between the heat exchanger tube 51 and the heat exchanger tube 52.

The high-temperature water supply line 53 is provided with a feedwater pump 55, and an inlet-side main shutoff valve 56 and an inlet-side auxiliary shutoff valve 57. A water filling line 61 from a feedwater tank 60 is connected to the high-temperature water supply line 53. A desalinated water pump 62 is provided in the water filling line 61. The high-temperature water return line 54 is provided with an outlet-side shutoff valve 63. The high-temperature water return line 54 is also provided with a feedwater vent line 68. A feedwater vent valve 69 and a feedwater level sensor 70 are provided in the feedwater vent line 68.

The high-temperature water return line 54 is provided with a pressure sensor 71 for detecting feedwater pressure between the feedwater vent line 68 and the outlet-side shutoff valve 63. The high-temperature water supply line 53 is provided with a pressure sensor 92 for detecting feedwater pressure between the second heater 42 and the inlet-side main shutoff valve 56 and the inlet-side auxiliary shutoff valve 57.

The method for detecting breakage of piping in the present embodiment includes the steps of: closing the outlet-side shutoff valve 63; supplying high-temperature water into the heat exchanger tubes 51, 52 with the desalinated water pump 62 (or the feedwater pump 55); closing the inlet-side main shutoff valve 56 and the inlet-side auxiliary shutoff valve 57 with the heat exchanger tubes 51, 52 filled with the high-temperature water; and determining breakage of the heat exchanger tubes 51, 52 based on a change in the pressure of the high-temperature water in the heat exchanger tubes 51, 52 closed by the inlet-side main shutoff valve 56 and the inlet-side auxiliary shutoff valve 57, and the outlet-side shutoff valve 63.

For this, the apparatus for detecting breakage of piping in the present embodiment has a control device 80 as a determination device of the present invention. The control device 80 determines that the heat exchanger tubes 51, 52 are broken when a detected pressure detected by the pressure sensor 71 deviates from a preset predetermined pressure range with the high-temperature water supply line 53, the heat exchanger tubes 51, 52, and the high-temperature water return line 54 filled with high-temperature water, and with the inlet-side main shutoff valve 56 and the inlet-side auxiliary shutoff valve 57, and the outlet-side shutoff valve 63 closed.

In the method for detecting breakage of piping in the second embodiment, first, the inlet-side main shutoff valve 56 and the inlet-side auxiliary shutoff valve 57 are opened, the outlet-side shutoff valve 63 is maintained in a closed state, and the desalinated water pump 62 is driven. Then, supply of water to the high-temperature water supply line 53, the heat exchanger tubes 51, 52, and the high-temperature water return line 54 is started, and internal air is discharged through the feedwater vent line 68, so that the feedwater pressure increases. When the feedwater level in the feedwater vent line 68 detected by the feedwater level sensor 70 reaches a preset predetermined feedwater level, the feedwater vent valve 69 is closed, the inlet-side main shutoff valve 56 and the inlet-side auxiliary shutoff valve 57 are closed, and the opening/closing valve 91 is closed. Here, the high-temperature water supply line 53, the heat exchanger tubes 51, 52, and the high-temperature water return line 54 isolated by the inlet-side main shutoff valve 56 and the inlet-side auxiliary shutoff valve 57, and the outlet-side shutoff valve 63 are maintained at a predetermined pressure.

The control device 80 determines breakage of the heat exchanger tubes 51, 52 based on a change in the pressure of the high-temperature water in the high-temperature water supply line 53, the heat exchanger tubes 51, 52, and the high-temperature water return line 54 closed by the inlet-side main shutoff valve 56 and the inlet-side auxiliary shutoff valve 57, and the outlet-side shutoff valve 63. Here, a region of the high-temperature water supply line 53, the heat exchanger tubes 51, 52, and the high-temperature water return line 54 closed by the inlet-side main shutoff valve 56 and the inlet-side auxiliary shutoff valve 57, and the outlet-side shutoff valve 63 is further divided by the opening/closing valve 91 into the heat exchanger tube 51 side and the heat exchanger tube 52 side.

Therefore, when the pressure of the high-temperature water (feedwater pressure) on the heat exchanger tube 51 side detected by the pressure sensor 71 is kept constant, the control device 80 determines that there is no leakage from the heat exchanger tube 51, nor breakage therein. On the other hand, when the pressure of the high-temperature water (feedwater pressure) on the heat exchanger tube 51 side detected by the pressure sensor 71 has decreased, the control device 80 determines that there is leakage of the high-temperature water from the heat exchanger tube 51, and that there is the possibility of breakage of the heat exchanger tube 51. When the pressure of the high-temperature water (feedwater pressure) on the heat exchanger tube 52 side detected by the pressure sensor 92 is kept constant, the control device 80 determines that there is no leakage from the heat exchanger tube 52, nor breakage therein. On the other hand, when the pressure of the high-temperature water (feedwater pressure) on the heat exchanger tube 52 side detected by the pressure sensor 92 has decreased, the control device 80 determines that there is leakage of the high-temperature water from the heat exchanger tube 52, and that there is the possibility of breakage of the heat exchanger tube 52.

Thereafter, when it is determined that neither the inlet-side main shutoff valve 56 nor the inlet-side auxiliary shutoff valve 57 has failed, and that the heat exchanger tubes 51, 52 are not broken, the inlet-side main shutoff valve 56 and the inlet-side auxiliary shutoff valve 57 are opened to continue an operation of filling the lines with water. When the operation of filling all the lines with water is completed, the inlet-side main shutoff valve 56 and the inlet-side auxiliary shutoff valve 57 are closed, and the desalinated water pump 62 is stopped.

Thus in the method for detecting breakage of piping in the second embodiment, the fuel gas heating apparatus 16 includes the first heater 41 and the second heater 42 connected in series, the inlet and the outlet of the heat exchanger tubes 51, 52 and a space therebetween are closed with the heat exchanger tubes 51, 52 filled with the high-temperature water, and breakages of the heat exchanger tubes 51, 52 are determined individually based on a change in the pressure of the high-temperature water in the heat exchanger tubes 51, 52 closed.

Accordingly, breakages of the heat exchanger tubes 51, 52 are determined based on a change in the pressure of the high-temperature water in the heat exchanger tubes 51, 52 with the heat exchanger tubes 51, 52 filled with the high-temperature water, and with the inlet and the outlet of the heat exchanger tubes 51, 52 and the space therebetween closed. Therefore, when there is a breakage in the heat exchanger tubes 51, 52, the high-temperature water leaks from the breakage, reducing the pressure, so that the breakage of the heat exchanger tubes 51, 52 can be properly detected regardless of the presence or absence of the fuel gas in the containers 43, 44. The opening/closing valve 91 closes the space between the heat exchanger tubes 51, 52, and thus breakages of the heat exchanger tubes 51, 52 can be simultaneously detected.

Although the first heater 41 and the second heater 42 constitute the fuel gas heating apparatus 16 in the above-described embodiments, the number of heaters may be one or three or more.

Further, in the above-described embodiments, the method and the apparatus for detecting breakage of piping of the present invention are applied to the fuel gas heating apparatus 16 in the combined cycle power plant 10 for description, but the present invention is not limited to this field, and may be applied to any heat exchangers in which piping is disposed in a container.

REFERENCE SIGNS LIST 10 combined cycle power plant
11 gas turbine
12 generator
13 heat recovery steam generator
14 steam turbine
15 generator
16 fuel gas heating apparatus
41 first heater (heat exchange unit)
42 second heater (heat exchange unit)
43, 44 container
51, 52 heat exchanger tube (piping)
53 high-temperature water supply line
54 high-temperature water return line
55 feedwater pump
56 inlet-side main shutoff valve
57 inlet-side auxiliary shutoff valve
60 feedwater tank
61 water filling line
62 desalinated water pump
63 outlet-side shutoff valve
68 feedwater vent line
69 feedwater vent valve
70 feedwater level sensor
71 pressure sensor
74, 75 level sensor
80 control device (determination device)
91 opening/closing valve
92 pressure sensor

The invention claimed is:

1. A method for detecting breakage of piping in a combined power plant in which piping through which a second fluid circulates is disposed in a container through which a first fluid circulates for heat exchange between the first fluid and the second fluid, the method comprising the steps of:
    closing an outlet of the piping;
    supplying the second fluid into the piping with a pump;
    closing an inlet of the piping with the piping filled with the second fluid; and
    determining breakage of the piping based on a change in pressure of the second fluid in the piping with the inlet and the outlet closed,
    wherein breakage of the piping is determined based on a change in the pressure of the second fluid in the piping when the outlet of the piping is closed after the first fluid bypasses the container through a bypass line and the second fluid is supplied to the piping in the combined power plant during startup of the combined power plant.

2. The method for detecting breakage of piping in the combined power plant according to claim 1, wherein it is determined that the piping is broken when the pressure of the second fluid in the piping with the inlet and the outlet closed deviates from a preset predetermined pressure range.

3. The method for detecting breakage of piping in the combined power plant according to claim 2, wherein the predetermined pressure range is set based on a pressure of the second fluid in the piping with the inlet and the outlet closed detected last time.

4. The method for detecting breakage of piping in the combined power plant according to claim 1, wherein breakage of the piping is determined based on a change in the pressure of the second fluid in the piping after an increase in pressure of the piping in the combined power plant.

5. The method for detecting breakage of piping in the combined power plant according to claim 1, wherein breakage of the piping is determined based on a change in the pressure of the second fluid in the piping after the inlet and the outlet are closed and the pump is stopped.

6. The method for detecting breakage of piping in the combined power plant according to claim 1, wherein the combined power plant includes a plurality of heat exchange units connected in series, the inlet and the outlet of the piping and a space between the plurality of heat exchange units are closed with the piping filled with the second fluid, and breakage of the piping is determined based on a change in the pressure of the second fluid in each region in the piping closed.

7. An apparatus for detecting breakage of piping in a combined power plant, the apparatus comprising:
    a container through which a first fluid circulates;
    piping through which a second fluid circulates, disposed in the container;
    a pump that supplies the second fluid into the piping;
    an inlet-side shutoff valve and an outlet-side shutoff valve that close an inlet and an outlet of the piping, respectively;
    a pressure sensor that detects a pressure of the second fluid in the piping with the inlet and the outlet closed by the inlet-side shutoff valve and the outlet-side shutoff valve; and a determination device that determines that the piping is broken when a detected pressure detected by the pressure sensor deviates from a preset predetermined pressure range, wherein breakage of the piping is determined based on a change in the pressure of the second fluid in the piping when the outlet of the piping is closed after the first fluid bypasses the container through a bypass line and the second fluid is supplied to the piping in the combined power plant during startup of the combined power plant.

* * * * *